United States Patent
Nishiguchi

(10) Patent No.: US 9,211,931 B2
(45) Date of Patent: Dec. 15, 2015

(54) CANISTER ARRANGEMENT STRUCTURE OF MOTORCYCLE

(71) Applicant: SUZUKI MOTOR CORPORATION, Shizuoka-Ken (JP)

(72) Inventor: Masaki Nishiguchi, Shizuoka-Ken (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 14/280,174

(22) Filed: May 16, 2014

(65) Prior Publication Data

US 2014/0339804 A1 Nov. 20, 2014

(30) Foreign Application Priority Data

May 20, 2013 (JP) .................................. 2013-105717

(51) Int. Cl.
*B62J 35/00* (2006.01)
*B62J 37/00* (2006.01)
*F02M 25/08* (2006.01)
*B60K 15/035* (2006.01)

(52) U.S. Cl.
CPC ................ *B62J 37/00* (2013.01); *F02M 25/08* (2013.01); *B60K 2015/03514* (2013.01)

(58) Field of Classification Search
CPC ..... B62K 11/00; B62K 2202/00; B62K 25/283
USPC ........................ 180/218, 219, 4; 123/518, 519
See application file for complete search history.

(56) References Cited

U.S. PATENT DOCUMENTS

| | | | | |
|---|---|---|---|---|
| 8,857,556 | B2 * | 10/2014 | Nishimura | 180/291 |
| 8,960,753 | B2 * | 2/2015 | Horiuchi et al. | 296/37.1 |
| 2010/0078241 | A1 * | 4/2010 | Maeda et al. | 180/68.3 |
| 2010/0163328 | A1 * | 7/2010 | Hasegawa | 180/225 |
| 2010/0243360 | A1 * | 9/2010 | Inaoka | 180/225 |
| 2011/0073399 | A1 * | 3/2011 | Seki | 180/219 |
| 2011/0120796 | A1 * | 5/2011 | Kuramochi et al. | 180/219 |

FOREIGN PATENT DOCUMENTS

JP 08142959 A 6/1996

* cited by examiner

*Primary Examiner* — Tony Winner
(74) *Attorney, Agent, or Firm* — Barnes & Thornburg LLP

(57) ABSTRACT

A motorcycle is provided with a vehicle body frame including a pair of left and right main frames and a pair of left and right seat rails disposed on the rear sides of the pair of left and right main frames, and the motorcycle is also provided with a canister for collecting evaporated fuel in a fuel tank supported by the main frames, the canister being arranged in an intermediate area in a width direction of the pair of left and right seat rails.

4 Claims, 8 Drawing Sheets

CANISTER ARRANGEMENT STRUCTURE OF MOTORCYCLE

PRIORITY CLAIM

This patent application claims priority to Japanese Patent Application No. 2013-105717, filed 20 May 2013; the disclosure of which is incorporated herein by reference in its entirety.

BACKGROUND OF THE INVENTION

1. Field of the Invention

The present invention relates to a canister arrangement structure of a motorcycle, as a vehicle, provided with a canister that collects evaporated fuel in a fuel tank.

2. Description of the Related Art

For example, Patent Document 1 (Japanese Patent Laid-Open Publication No. HEI 8-142959) discloses a motorcycle in which a canister for collecting evaporated fuel generated in a fuel tank is arranged at a place on the outside of seat rails. That is, in general, a canister is arranged or mounted outside a pair of left and right seat rails because a housing space for housing in-vehicle tools, inspection manuals, and the like is provided inside the pair of left and right seat rails.

However, if the canister is arranged outside the pair of left and right seat rails, a vehicle rear cover (for example, a rear side cover) bulges laterally outward (i.e., leftward and rightward) in a vehicle width direction so as to cover the canister, which spoils an appearance of the vehicle rear.

SUMMARY OF THE INVENTION

The present invention was conceived in consideration of the circumstances mentioned above and an object thereof is to provide a canister arrangement structure for a motorcycle in which a canister can be placed while maintaining a compact vehicle rear without spoiling an appearance of the vehicle rear.

The above and other objects can be achieved according to the present invention by providing a canister arrangement structure for a motorcycle provided with a vehicle body frame including a pair of left and right main frames and a pair of left and right seat rails disposed on the rear sides of the pair of left and right main frames, wherein a canister that collects evaporated fuel in a fuel tank supported by the main frames is arranged in an intermediate area in a width direction of the pair of left and right seat rails.

In the above aspect of the present invention, the following preferred embodiments may be provided.

It may be desired that the canister may be arranged with a longitudinal direction thereof being directed in a vehicle front-rear direction on a plan view of a motorcycle as a vehicle.

It may be also desired that a housing section that houses a vehicle loading article is formed on a side of the canister in the intermediate area in the width direction of the pair of left and right seat rails, and the housing section is located so as to overlap the location of the canister on a side view of the vehicle.

It may be further desired that the canister is arranged in a substantially middle position in the width direction of the pair of left and right seat rails on a plan view of the vehicle, and housing sections are provided on left and right side positions of the canister.

It may be further desired that the housing sections provided on both lateral sides of the canister are communicated in the width direction of the seat rails on at least one of front and rear sides of the canister.

It may be desired that a rear wheel of the motorcycle is located below the seat rails, the canister is arranged on a rear side of the front end portion of the rear wheel so as to overlap the seat rails on a side view of the vehicle.

According to the present invention, the canister is arranged in the intermediate area in the width direction of the pair of left and right seat rails, that is, in an inner space of the pair of left and right seat rails. Thus, such arrangement or location of the canister can reduce formation of a bulged portion of a vehicle rear cover. According to such advantageous configuration, there can provide a motorcycle having a compact vehicle rear portion, and it becomes possible to arrange the canister without spoiling an appearance of the vehicle, particularly, the rear side portion thereof.

The nature and further characteristic features of the present invention will be made clearer from the following descriptions made with reference to the accompanying drawings.

DESCRIPTION OF THE PREFERRED EMBODIMENT

Hereunder, an embodiment for carrying out the present invention will be described with reference to the accompanying drawings. Further, it is to be noted that terms such as "upper", "lower", "right", "left" and like terms indication direction are used herein with reference to the illustrations of the drawings or in an actual standing state of a motorcycle.

Figure 1:
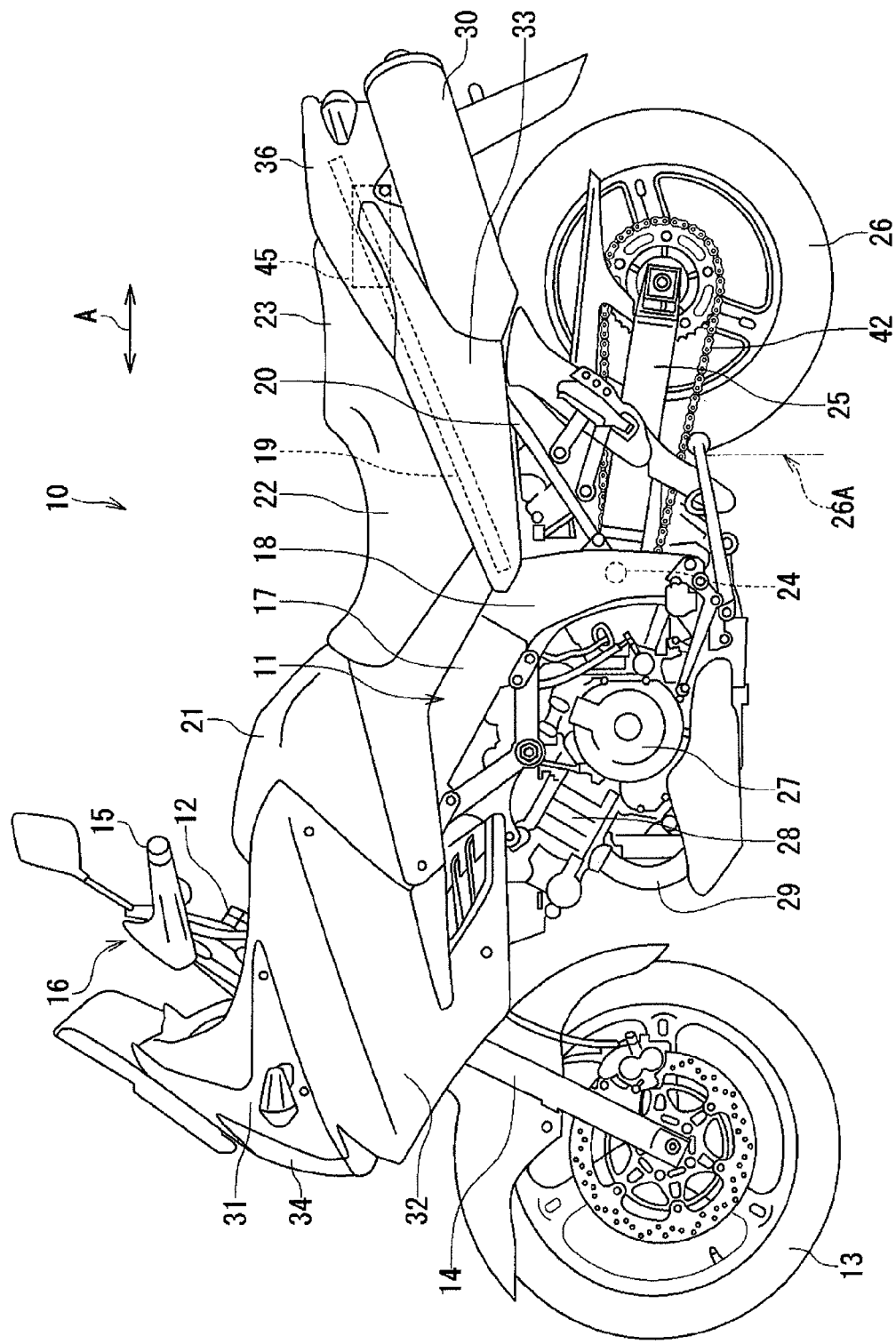
FIG. 1 is a left side view showing a motorcycle to which an embodiment of a canister arrangement structure of a motorcycle according to the present invention is applied.
Figure 2:
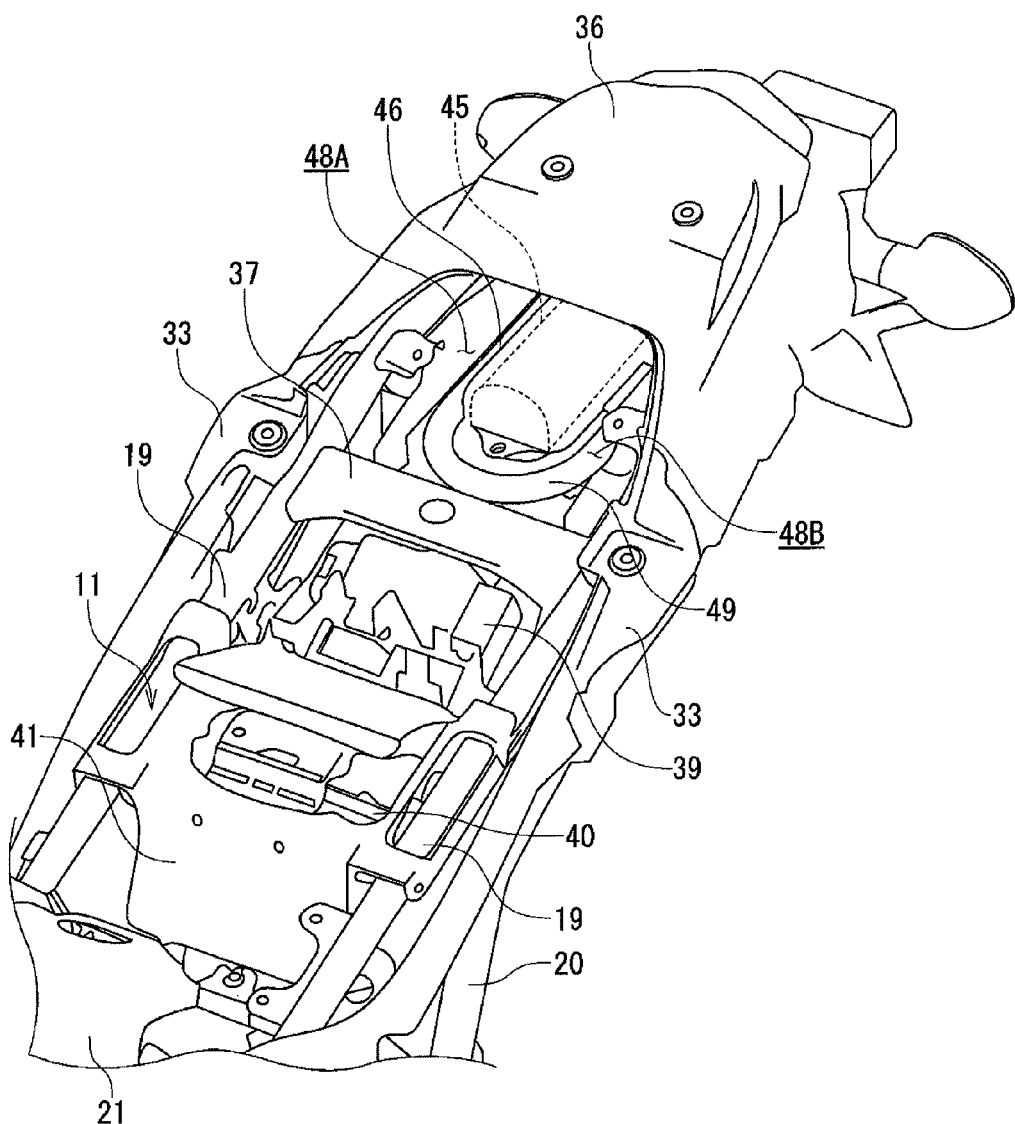
FIG. 2 is a perspective view showing a vehicle rear portion of the motorcycle, shown in FIG. 1, with a seat being removed.

With reference to FIGS. 1 and 2, a motorcycle 10, as a vehicle, includes a vehicle body, a vehicle body frame 11, and a head pipe 12 is provided in front of the vehicle body frame 11. A steering mechanism 16 including a pair of left and right front forks 14, a handlebar 15 and others. The paired front forks 14 also include a suspension mechanism, not shown, and support a front wheel 13 to be rotatable, and the handlebar 15 is operated to steer the front wheel 13 to left and right.

The vehicle body frame 11 is, for example, of a twin-tube type and includes a pair of main frames 17, a pair of left and right center frames 18, a pair of left and right seal rails 19, and seat pillars 20.

The paired main frames 17 also serve as tank rails expanded in a vehicle width direction just after the head pipe 12 and then extend obliquely downward in parallel with each other. The paired left and right center frames 18 are connected to rear ends of the main frames 17 and extend substantially vertically. The paired left and right seat rails 19 and the seat pillars 20 that extend rearward from rear ends of the center frames 18.

A fuel tank 21 is mounted on and supported by the main frames 17. A ride seat 22 and a pillion seat 23 are arranged in order behind the fuel tank 21 and on the seat rails 19 and the seat pillars 20. A pivot shaft 24 is disposed at a substantially middle lower portion of the center frame 18, and a swing arm 25 is pivoted by the pivot shaft 24 so as to be vertically swingable around the pivot shaft 24. A rear wheel 26 is supported to be rotatable at a rear end portion of the swing arm 25.

An engine 27 is suspended from the main frame 17 and the center frame 18 and mounted below the fuel tank 21 in a substantially middle lower portion in a vehicle front-rear direction (i.e., longitudinal direction) between the front wheel 13 and the rear wheel 26. A drive force of the engine 27 is transmitted to the rear wheel 26 via a drive chain 42 or the like.

A throttle body, a fuel injector and an air cleaner, not shown, and the like, which constitute an engine intake system, are connected in this order to a rear portion of a cylinder head 28 constituting the engine 27. An air fuel mixture is supplied from the engine intake system to a combustion chamber, not shown, of the engine 27.

Furthermore, an exhaust pipe 29 and an exhaust silencer 30, which constitute an engine exhaust system, are connected in this order to a front portion of the cylinder head 28. The exhaust pipe 29 extends downward from the front portion of the cylinder head 28 and then extends rearward, and the exhaust silencer 30 is connected to a rear end portion of the exhaust pipe 29.

In the motorcycle 10, a vehicle front side is covered with a front cover 31, side portions of the are covered with a side cover 32, and lower portions of the rider seat 22 and the pillion seat 23 are covered with a rear side cover 33 or the like as a vehicle rear cover. A head lamp 34 is provided on the front cover 31.

Figure 3:
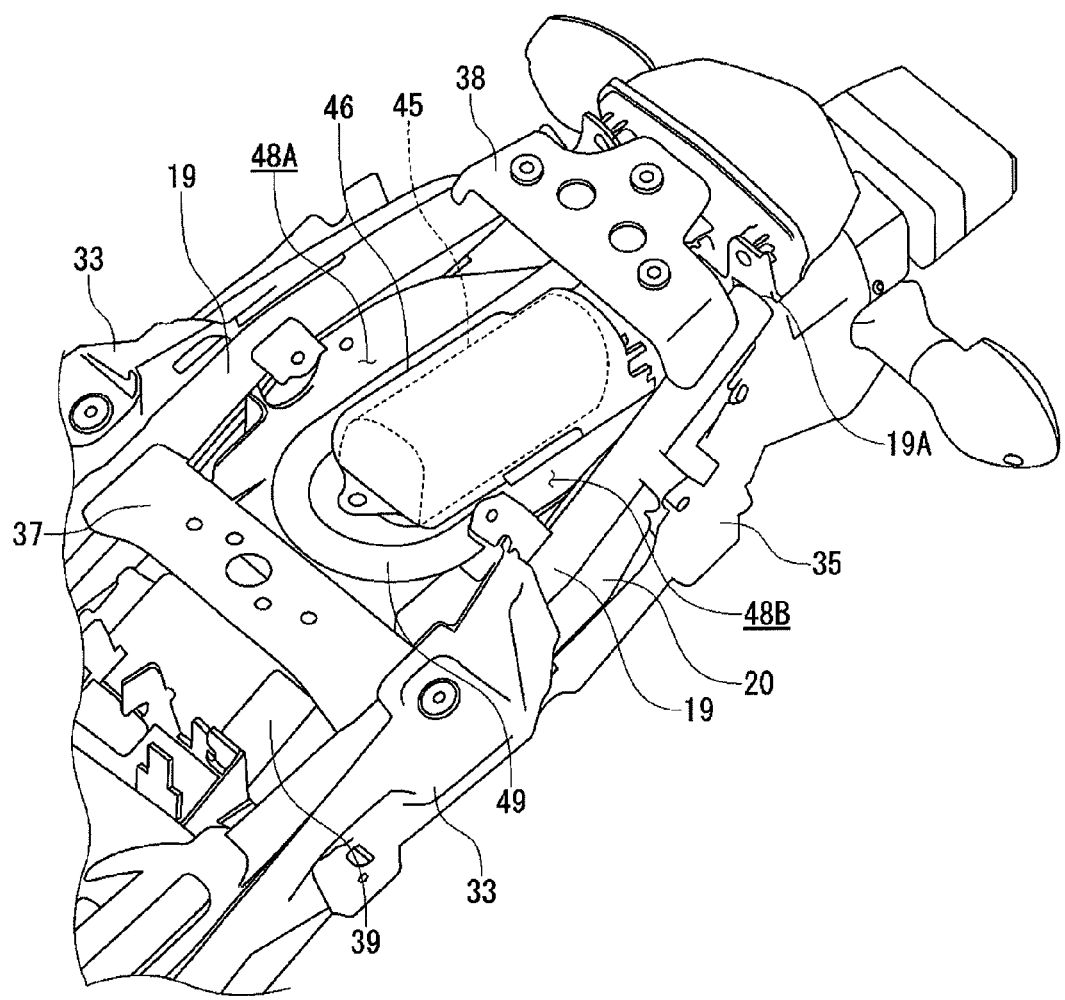
FIG. 3 is a perspective view showing the vehicle rear portion in FIG. 2, with an upper rear fender being further removed.

As shown in FIGS. 1 to 3, the seat rails 19 and the seat pillars 20 are provided above the rear wheel 26, and a lower rear fender 35 is mounted to the seat rails 19 and the seat pillars 20. Further, an upper rear fender 36 is mounted to the seat rails 19 and the seat pillars 20 so as to cover rear ends of the seat rails 19 and the seat pillars 20 and the lower rear fender 35 from the upper side. The lower rear fender 35 and the upper rear fender 36 cover an upper portion of the rear wheel 26.

In FIGS. 2 and 3, reference numeral 37 denotes a front bridge that couples a pair of left and right seat rails 19, and reference numeral 38 denotes a rear bridge that couples a pair of left and right seat rails 19. An electric control unit (ECU) 39 as a control unit is provided near the front bridge 37 in an intermediate area in a width direction of the pair of left and right seat rails 19, and a battery 40 housed in a battery holder 41 is provided in front of the ECU 39.

In order to reduce influences on environment, the motorcycle 10 of the present embodiment includes a canister 45 that collects fuel evaporated in the fuel tank 21 (called evaporated fuel herein) at an operation stop of the engine 27 by being adsorbed on active carbon. The evaporated fuel collected in the canister 45 is taken out by negative pressure generated in the engine intake system during the operation of the engine 27, supplied via the engine intake system to the engine 27 and then burned therein.

Figure 4:
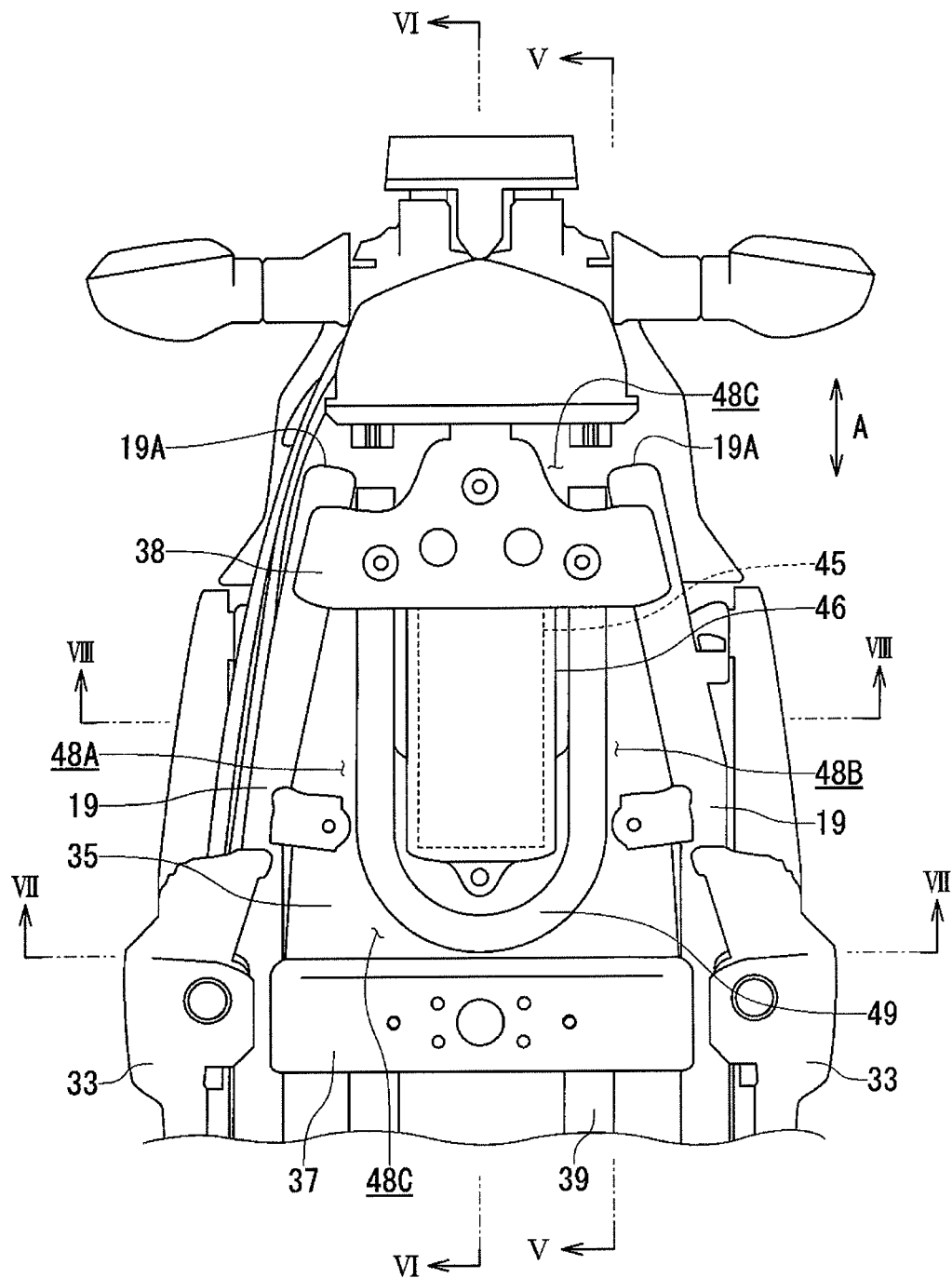
FIG. 4 is a plan view showing the vehicle rear portion shown in FIG. 3.

As shown in FIGS. 3 and 4, the canister 45 is arranged in the intermediate area in the width direction of the pair of left and right seat rails 19. Specifically, the canister 45 is placed to a substantially middle position in the width direction of the pair of left and right seat rails 19. In this state, the longitudinal direction of the canister 45 is directed in a vehicle front-rear direction "A", on plan view of the vehicle, and covered with a canister cover 46 on the lower rear fender 35.

Figure 6:
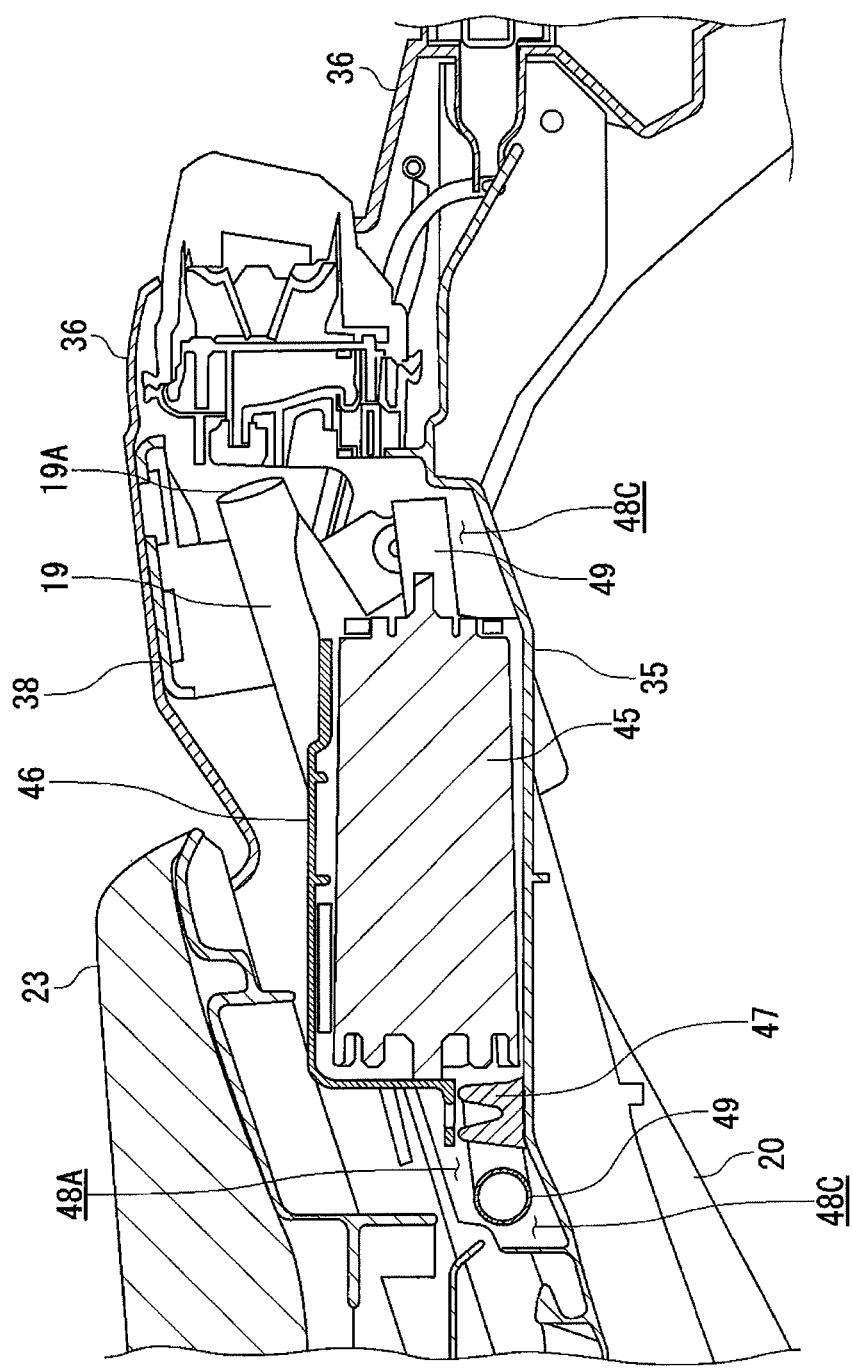
FIG. 6 is a sectional view taken along the line VI-VI in FIG. 4.

As shown in FIG. 6, the canister cover 46 is mounted to a mounting boss 47 provided on the lower rear fender 35 using a screw or like, not shown.

Figure 5:
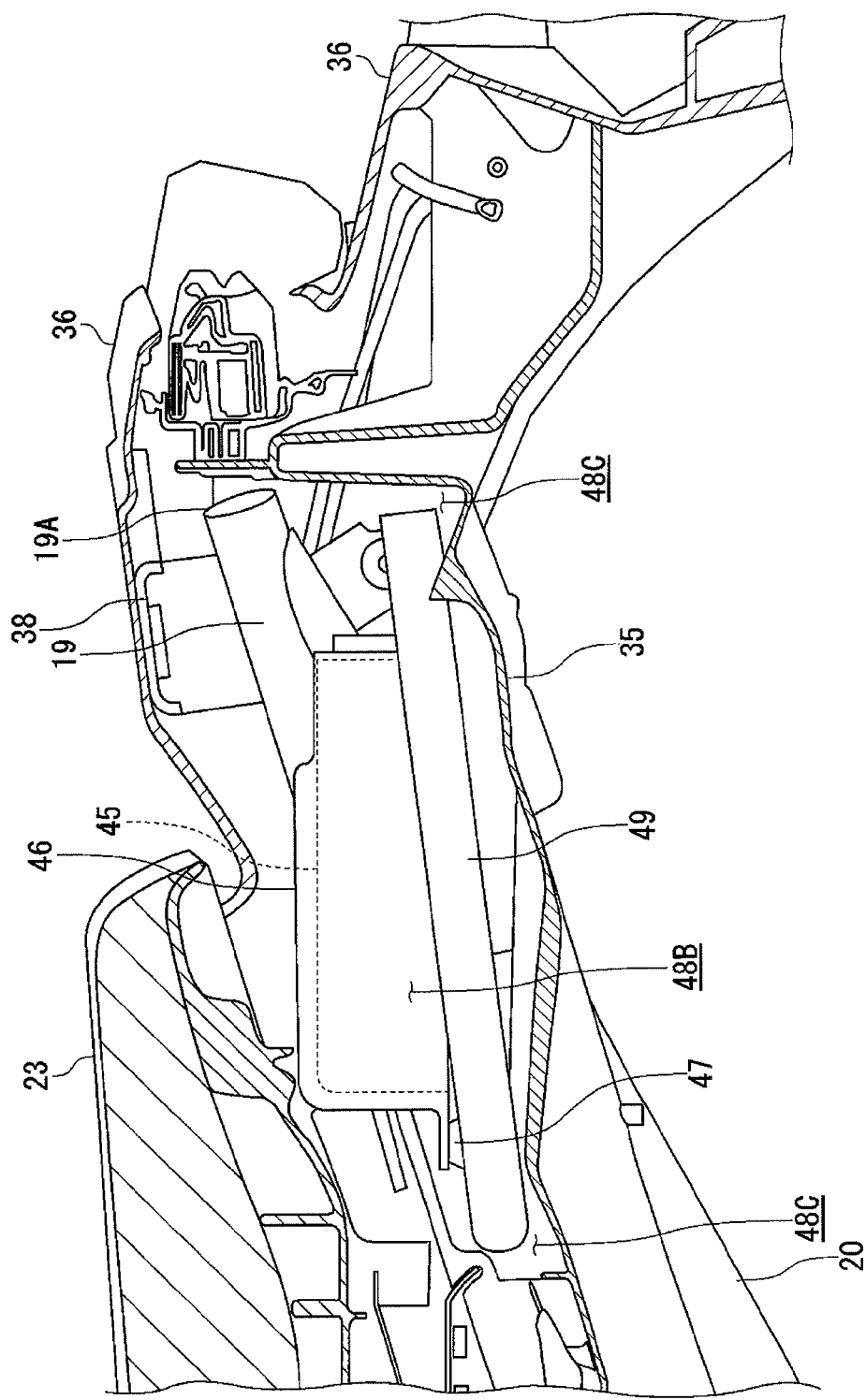
FIG. 5 is a sectional view taken along the line V-V in FIG. 4.

As shown in FIG. 1, the canister 45 is located behind a front end portion 26A of the rear wheel 26, and as shown in FIGS. 1, 5 and 6, located in front of a rear end portion 19A of the seat rails 19. The canister 45 is placed so as to overlap the seat rails 19 on side view of the vehicle. Further, the canister 45 is placed so as to overlap the rear end portion of the pillion seat 23 on the plan view of the vehicle, or located behind the rear end portions of the pillion seat 23 and below the pillion seat 23.

Figure 7:
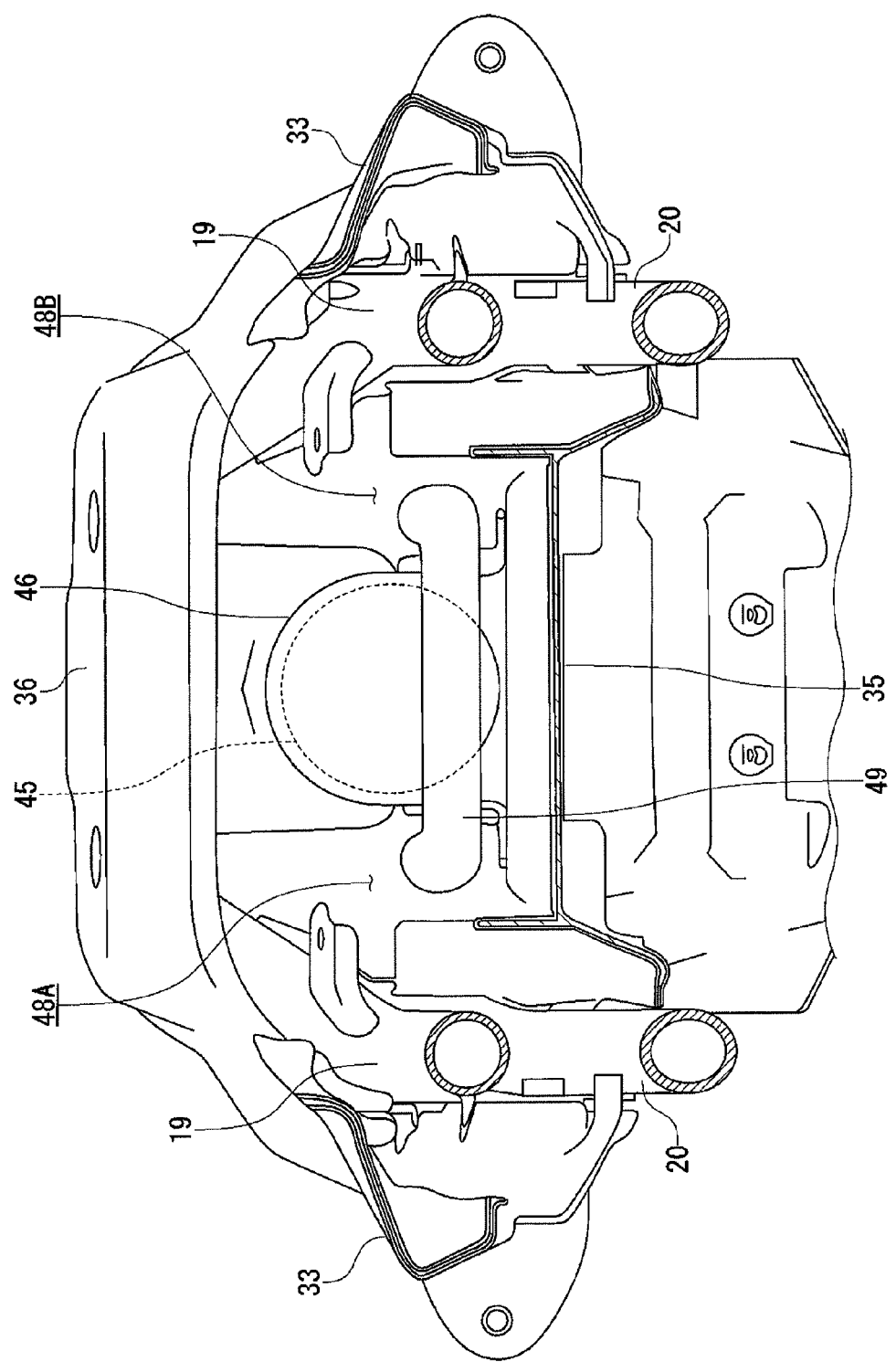
FIG. 7 is a sectional view taken along the line VII-VII in FIG. 4.
Figure 8:
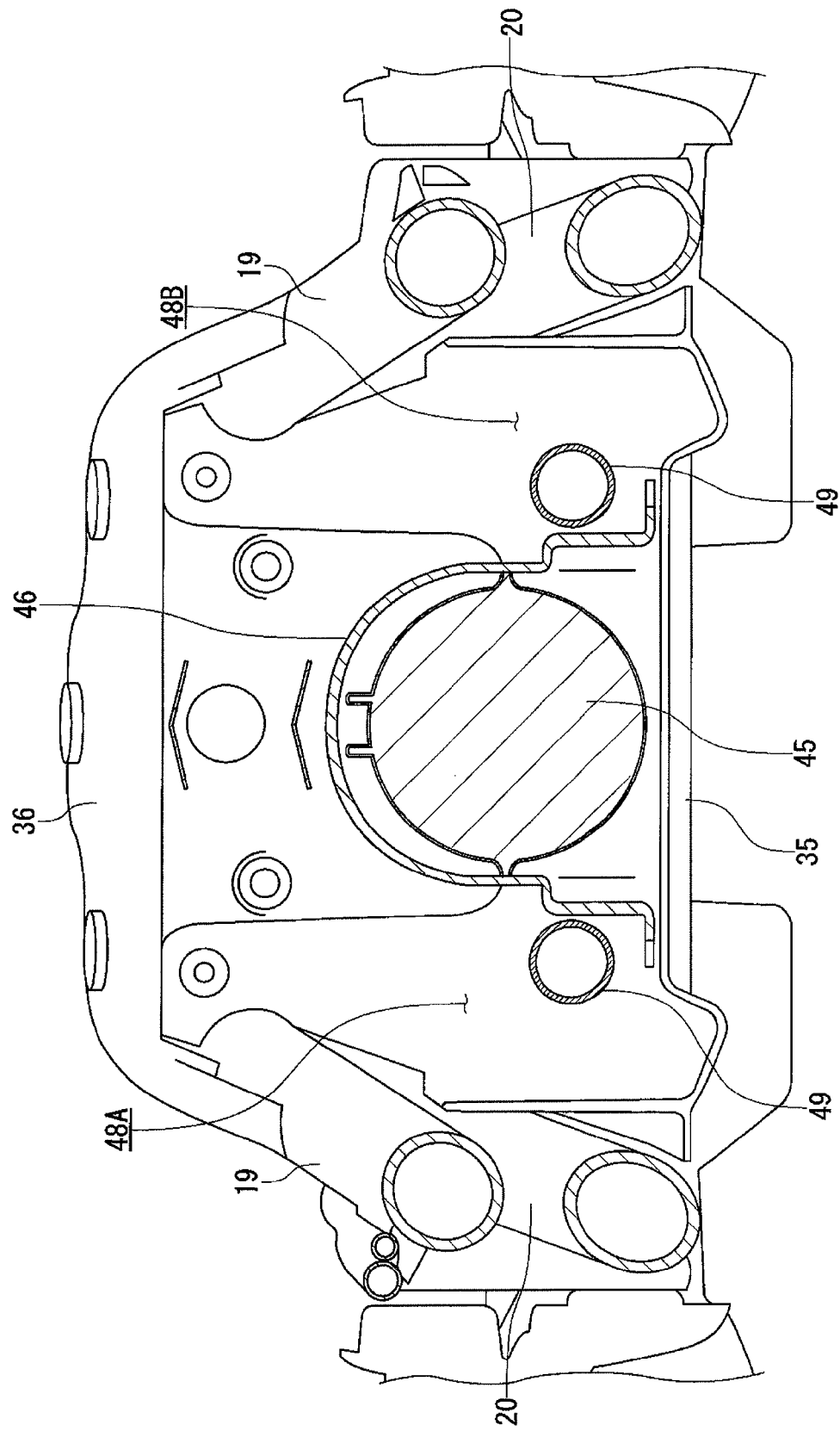
FIG. 8 is a sectional view taken along the line VIII-VIII in FIG. 4.

As shown in FIGS. 4, 7 and 8, housing sections 48A and 48B that house a vehicle load parts or components are provided on left and right sides of the canister 45 in the intermediate area in the width direction of the pair of left and right seat rails 19. The housing sections 48A and 48B are provided so as to overlap the canister 45 on the side view of the vehicle, and according to such overlapping arrangement, the housing sections are formed as a housing space surrounded by the lower rear fender 35, the seat rails 19 and the seat pillars 20, the canister 45 and the canister cover 46, the upper rear fender 36 and the pillion seat 23.

Furthermore, the housing sections 48A and 48B are communicated with each other through a housing communication portion 48C in the width direction of the seat rails 19 on at least one of the front and rear sides of the canister 45 (in this embodiment, both the front and the rear sides). Thus, a U-shaped lock member 49 can be housed in the housing sections 48A and 48B and the housing communication section 48C. The vehicle load parts or components is taken in and taken out of the housing sections 48A and 48B and the housing communication section 48C by raising the rear end portion of the pillion seat 23.

With the arrangement and configuration of the motorcycle 10 provided with the canister 45 as described above, the following advantageous effects and functions (1) to (6) would be achieved.

(1) As shown in FIGS. 2 to 4, the canister 45 is arranged in the intermediate area in the width direction of the pair of left and right seat rails 19, that is, in an inner space of the pair of left and right seat rails 19 of the motorcycle 10. Accordingly, the arrangement of the canister 45 can reduce an outward bulge to left and right sides in the vehicle width direction of the rear side cover 33, thereby providing a thin and compact structure of the vehicle rear side portion, and the canister 45 can be located without spoiling an outer appearance of the vehicle rear side portion.

(2) The canister 45 is located with the longitudinal direction thereof being directed in the vehicle front-rear (longitudinal) direction "A" on plan view of the vehicle, and is thus substantially parallel to the seat rail 19 similarly extending in the vehicle front-rear direction "A". Accordingly, the placement of the canister 45 can further reduce a bulge expanding outward and leftward and rightward in the vehicle width direction of the rear side cover 33, thereby improving an appearance of the vehicle rear side and comfort feeling of the rider during driving.

(3) As shown in FIGS. 4, 7 and 8, the housing sections 48A and 48B are provided on the left and right sides of the canister 45 located with the longitudinal direction thereof being directed in the vehicle front-rear direction "A". Accordingly, the housing sections 48A and 48B are formed as spaces extending in the vehicle front-rear direction "A", which allows a long-size vehicle loading parts such as an in-vehicle tool to be satisfactorily housed in the housing sections 48A and 48B.

(4) The housing sections 48A and 48B are provided on the left and right sides of the canister 45, and thus vehicle loads, for example, in-vehicle tools, inspection manuals, or the like, can be separately housed in the separate housing sections 48A and 48B, thus being convenient for housing.

(5) The housing sections 48A and 48B communicate via the housing communication section 48C in the width direction of the seat rails 19 on at least one of the front and rear portions of the canister 45. Thus, the U-shaped lock member 49 can be housed in the housing sections 48A and 48B and the housing communication section 48C. In addition, since the canister 45 is located in the inner space as a dead space of the housed lock member 49, the dead space of the housed lock member 49 can be effectively used.

(6) As shown in FIG. 1, the canister 45 is arranged behind the front end portion 26A of the rear wheel 26 so as to overlap the seat rail 19 on the side view of the vehicle. The vehicle rear portion above the rear wheel 26 is vertically thinned toward the rear portion, and the canister 45 is located in the vehicle rear portion without hanging down below the seat rail 19, thereby maintaining the cleanness of the thin vehicle rear portion without spoiling an appearance thereof.

It is further to be noted that the present invention is not limited to the described embodiment, and many other changes and modifications or alternations may be made without departing from the scopes of the appended claims.

For example, the canister 45 may be located above the seat rails 19 without overlapping the seat rails 19 on the side view of the vehicle.

What is claimed is:

1. A canister arrangement structure for a motorcycle provided with a vehicle body frame including a pair of left and right main frames and a pair of left and right seat rails disposed on the rear sides of the pair of left and right main frames,
    wherein a canister that collects evaporated fuel in a fuel tank supported by the main frames is arranged in an intermediate area in a width direction of the pair of left and right seat rails, the canister is arranged with a longitudinal direction thereof being directed in a vehicle front-rear direction of the motorcycle, and
    wherein at least one housing section that houses a vehicle loading article is formed on a side of the canister in the intermediate area in the width direction of the pair of left and right seat rails, and
    wherein the housing section is located so as to overlap the location of the canister on a side view of the vehicle.

2. The canister arrangement structure for a motorcycle according to claim 1, wherein the canister is arranged in a substantially middle position in the width direction of the pair of left and right seat rails of the vehicle, and
    wherein the at least one housing further comprises a plurality of housing sections, wherein the housing sections are provided on the left and right side positions of the canister.

3. The canister arrangement structure for a motorcycle according to claim 2, wherein the housing sections provided on both lateral sides of the canister are communicated in the width direction of the seat rails on at least one of front and rear sides of the canister.

4. The canister arrangement structure for a motorcycle according to claim 1, wherein a rear wheel of the motorcycle is located below the seat rails, the canister is arranged behind the front end portion of the rear wheel so as to overlap the seat rails on a side view of the vehicle.

* * * * *